United States Patent
Zhang et al.

(10) Patent No.: US 11,860,619 B2
(45) Date of Patent: Jan. 2, 2024

(54) FAULT EARLY-WARNING METHOD AND SYSTEM APPLIED TO GAS TURBINE UNIT, AND APPARATUS

(71) Applicant: HUADIAN ELECTRIC POWER RESEARCH INSTITUTE CO., LTD., Hangzhou (CN)

(72) Inventors: Kun Zhang, Hangzhou (CN); Hongren Li, Hangzhou (CN); Pingyang Zi, Hangzhou (CN); Wei Li, Hangzhou (CN); Liang Sun, Hangzhou (CN)

(73) Assignee: HUADIAN ELECTRIC POWER RESEARCH INSTITUTE CO., LTD., Hangzhou (CN)

( * ) Notice: Subject to any disclaimer, the term of this patent is extended or adjusted under 35 U.S.C. 154(b) by 0 days.

(21) Appl. No.: 18/313,525

(22) Filed: May 8, 2023

(65) Prior Publication Data
US 2023/0393571 A1    Dec. 7, 2023

Related U.S. Application Data

(63) Continuation of application No. PCT/CN2022/121824, filed on Sep. 27, 2022.

(30) Foreign Application Priority Data

Jun. 6, 2022    (CN) .......................... 202210633645.3

(51) Int. Cl.
*G06F 30/20* (2020.01)
*G05B 23/02* (2006.01)
*G06F 119/02* (2020.01)

(52) U.S. Cl.
CPC ......... *G05B 23/0283* (2013.01); *G06F 30/20* (2020.01); *G06F 2119/02* (2020.01)

(58) Field of Classification Search
CPC .. G05B 23/0283; G06F 30/20; G06F 2119/02
See application file for complete search history.

(56) References Cited

U.S. PATENT DOCUMENTS

2009/0326884 A1\* 12/2009 Amemiya ............... G06F 30/20
                                                                    703/6
2019/0284955 A1    9/2019 Kim

FOREIGN PATENT DOCUMENTS

CN    111693084 A        9/2020
CN    111783237 A  \*  10/2020    ............. G06F 30/17
(Continued)

OTHER PUBLICATIONS

Simpson TW, Mauery TM, Korte JJ, Mistree F. Kriging models for global approximation in simulation-based multidisciplinary design optimization. AIAA journal. Dec. 2001;39(12):2233-41. (Year: 2001).\*

(Continued)

*Primary Examiner* — Chuen-Meei Gan
(74) *Attorney, Agent, or Firm* — Westbridge IP LLC

(57) ABSTRACT

Disclosed are a fault early-warning method and a fault early-warning system applied to a gas turbine unit, and an apparatus. The method includes: calculating, by means of a mechanism model, predicted data of prediction parameters in a gas turbine unit, and performing data comparison on the predicted data and real data of the prediction parameters, so as to obtain an error matrix; constructing several Kriging primary functions according to the mechanism model; screening an optimal Kriging primary function from the several Kriging primary functions according to the error matrix, and performing error compensation on the mechanism model by using the optimal Kriging primary function; and performing fault early warning on the gas turbine unit by means of the mechanism model after error compensation. By means of the present application, the problem of a large (Continued)

number of fault false alarms in fault early warning of an existing gas turbine is solved.

6 Claims, 2 Drawing Sheets

(56) References Cited

FOREIGN PATENT DOCUMENTS

| | | |
|---|---|---|
| CN | 113703422 A | 11/2021 |
| CN | 113761803 A | 12/2021 |
| CN | 115062425 A | 9/2022 |

OTHER PUBLICATIONS

Written Opinion issued in corresponding PCT Application No. PCT/CN2022/121824, dated Jan. 17, 2023.

* cited by examiner

FAULT EARLY-WARNING METHOD AND SYSTEM APPLIED TO GAS TURBINE UNIT, AND APPARATUS

CROSS-REFERENCE TO RELATED APPLICATIONS

This application is a continuation of International Application No. PCT/CN2022/121824, filed on Sep. 27, 2022, which claims priority to Chinese Patent Application No. 202210633645.3, filed on Jun. 6, 2022. All of the aforementioned applications are incorporated herein by reference in their entireties.

TECHNICAL FIELD

The present application relates to the technical field of computers, and in particular, to a fault early-warning method and a fault early-warning system applied to a gas turbine unit, and an apparatus.

BACKGROUND

A gas turbine has the advantages of being high in heat efficiency, stable in running, small in size, large in power, fast in startup and little in pollution, and is relatively safe during actual production run compared with traditional power devices, such that the gas turbine is a new generation of core power units following a steam turbine and an internal-combustion engine. The application of the gas turbine becomes wider and wider. Since the birth of the gas turbine, the gas turbine has been widely applied to fields such as aviation, shipping, and power generation. With the massive exploitation of global natural gas resources, the growing demand for peak regulation of the power grid, and the rapid development of distributed energy systems, the gas turbine is becoming more and more important in the field of power generation in China. Therefore, the gas turbine will serve as the core power equipment for efficient conversion and clean utilization of energy for a long time to come.

In order to ensure that the gas turbine can continue to run safely and reliably for a long time, the running state of the gas turbine increasingly becomes important research content. A gas turbine unit is of a complex structure, of which components generally work under extreme conditions of high temperature, high pressure and high-speed rotation. A peak regulation gas turbine unit is started and stopped frequently. As a result, faults and damages are easily occur in the gas turbine unit in a running state, affecting supply guarantee tasks of the power grid. A traditional fault early-warning diagnosis model has a large number of fault false alarms, resulting in real fault information being covered up and thus losing the role of early warning.

Currently, with regard to the problem of a large number of fault false alarms in fault early warning of the gas turbine in the related art, an effective solution has not been proposed.

SUMMARY

The embodiments of the present application provide a fault early-warning method and a fault early-warning system applied to a gas turbine unit, and an apparatus, to at least solve the problem of a large number of fault false alarms in fault early warning of the gas turbine in the related art.

According to a first aspect, an embodiment of the present application provides a fault early-warning method applied to a gas turbine unit. The method includes the following operations.

Predicted data of prediction parameters in a gas turbine unit is calculated by means of a mechanism model, and data comparison is performed on the predicted data and real data of the prediction parameters, so as to obtain an error matrix.

Several Kriging primary functions are constructed according to the mechanism model.

An optimal Kriging primary function is screened from the several Kriging primary functions according to the error matrix, and error compensation is performed on the mechanism model by using the optimal Kriging primary function.

Fault early warning is performed on the gas turbine unit by means of the mechanism model after error compensation.

In some embodiments, the operation of screening the optimal Kriging primary function from the several Kriging primary functions according to the error matrix includes the following operations.

The error matrix is respectively fitted by means of the several Kriging primary functions, and the Kriging primary functions are screened according to several fitting results, so as to obtain a first primary function set.

Reliability indexes of the several Kriging primary functions in the first primary function set are calculated, and the optimal Kriging primary function is screened according to the reliability indexes.

In some embodiments, the operation of calculating the reliability indexes of the several Kriging primary functions in the first primary function set, and screening the optimal Kriging primary function according to the reliability indexes includes the following operations.

The reliability indexes of the Kriging primary functions in the first primary function set are respectively calculated by means of a Monte Carlo algorithm, a particle swarm optimization algorithm, a response surface algorithm and a unitary quadratic matrix algorithm.

A second primary function set with a convergence rate being higher than a preset threshold is screened according to the reliability indexes, and then the optimal Kriging primary function is screened from the second primary function set.

In some embodiments, the operation of screening the optimal Kriging primary function from the second primary function set includes the following operations.

Derivatives of the Kriging primary functions in the second primary function set are calculated, and curve morphological characteristics of the Kriging primary functions are determined according to the derivatives. The curve morphological characteristics include a unimodal maximum characteristic, a unimodal minimum characteristic and a multimodal characteristic.

The optimal Kriging primary function is screened from the second primary function set according to the curve morphological characteristics.

In some embodiments, the operation of screening the optimal Kriging primary function from the second primary function set according to the curve morphological characteristics includes the following operations.

It is determined, according to the curve morphological characteristics, whether the corresponding Kriging primary function has a similar characteristic to a Schwefel function or a trigonometric function.

If the Kriging primary function has a similar characteristic to the Schwefel function, a Tanimoto similarity between the Kriging primary function and the Schwefel function is calculated by means of a Tanimoto similarity function.

If the Kriging primary function has a similar characteristic to the trigonometric function, a Tanimoto similarity between the Kriging primary function and the trigonometric function is calculated by means of the Tanimoto similarity function.

The optimal Kriging primary function is screened from the second primary function set according to the Tanimoto similarity.

In some embodiments, the operation of screening, according to the reliability indexes, the second primary function set with the convergence rate being higher than the preset threshold includes the following operations.

An optimal calculation algorithm is selected from the monte carlo algorithm, the particle swarm optimization algorithm, the response surface algorithm and the unitary quadratic matrix algorithm according to the number of function calculations of the reliability indexes of the Kriging primary functions.

The second primary function set with the convergence rate being higher than the preset threshold is screened according to the reliability indexes calculated by the optimal calculation algorithm.

In some embodiments, the operation of constructing the several preset Kriging primary functions according to the mechanism model includes the following operation.

Input parameters of the mechanism model are used as input parameters of the Kriging primary functions, and prediction parameters of the mechanism model are used as output parameters of the Kriging primary functions, so as to construct the several preset Kriging primary functions.

In some embodiments, the operation of calculating, by means of the mechanism model, the predicted data of the prediction parameters in the gas turbine unit includes the following operation.

Input data of the gas turbine unit is inputted into the mechanism model, and the predicted data of the prediction parameters in the gas turbine unit is calculated. Input parameters corresponding to the input data include a gas turbine rotary speed, generator power, an environment temperature, and environment humidity; and the prediction parameters include first axial displacement, second axial displacement, third axial displacement, high-pressure cylinder expansion, differential expansion of high and medium-pressure cylinders, low-pressure cylinder expansion, and high-pressure main steam pressure.

According to a second aspect, an embodiment of the present application provides a fault early-warning system applied to a gas turbine unit. The system includes a data acquisition module, an error compensation module, and a fault early-warning module.

The data acquisition module is configured to calculate, by means of a mechanism model, predicted data of prediction parameters in a gas turbine unit, and perform data comparison on the predicted data and real data of the prediction parameters, so as to obtain an error matrix.

The error compensation module is configured to construct several Kriging primary functions according to the mechanism model; and screen an optimal Kriging primary function from the several Kriging primary functions according to the error matrix, and perform error compensation on the mechanism model by using the optimal Kriging primary function.

The fault early-warning module is configured to perform fault early warning on the gas turbine unit by means of the mechanism model after error compensation.

According to a third aspect, an embodiment of the present application provides an electronic apparatus. The electronic apparatus includes a memory, a processor, and a computer program that is stored on the memory and executable on the processor. The processor, when executing the computer program, implements the fault early-warning method applied to a gas turbine unit as described in the first aspect.

Compared with the related art, according to the fault early-warning method and a fault early-warning system applied to a gas turbine unit, and the apparatus provided in the embodiments of the present application, the predicted data of the prediction parameters in the gas turbine unit is calculated by means of the mechanism model, and data comparison is performed on the predicted data and the real data of the prediction parameters, so as to obtain the error matrix; the several Kriging primary functions are constructed according to the mechanism model; the optimal Kriging primary function is screened from the several Kriging primary functions according to the error matrix, and error compensation is performed on the mechanism model by using the optimal Kriging primary function; and fault early warning is performed on the gas turbine unit by means of the mechanism model after error compensation. Therefore, the problem of a large number of fault false alarms in fault early warning of an existing gas turbine is solved, the fault early warning of the gas turbine unit after error compensation is performed on the mechanism model on the basis of the improved Kriging primary functions is realized, and a false alarm rate of the mechanism model for fault early warning is reduced.

BRIEF DESCRIPTION OF THE DRAWINGS

The drawings described herein are used to provide a further understanding of the present application, and constitute a part of the present application. The exemplary embodiments of the present application and the description thereof are used to explain the present application, but do not constitute improper limitations to the present application. In the drawings.

DETAILED DESCRIPTION OF THE EMBODIMENTS

Figure 1:
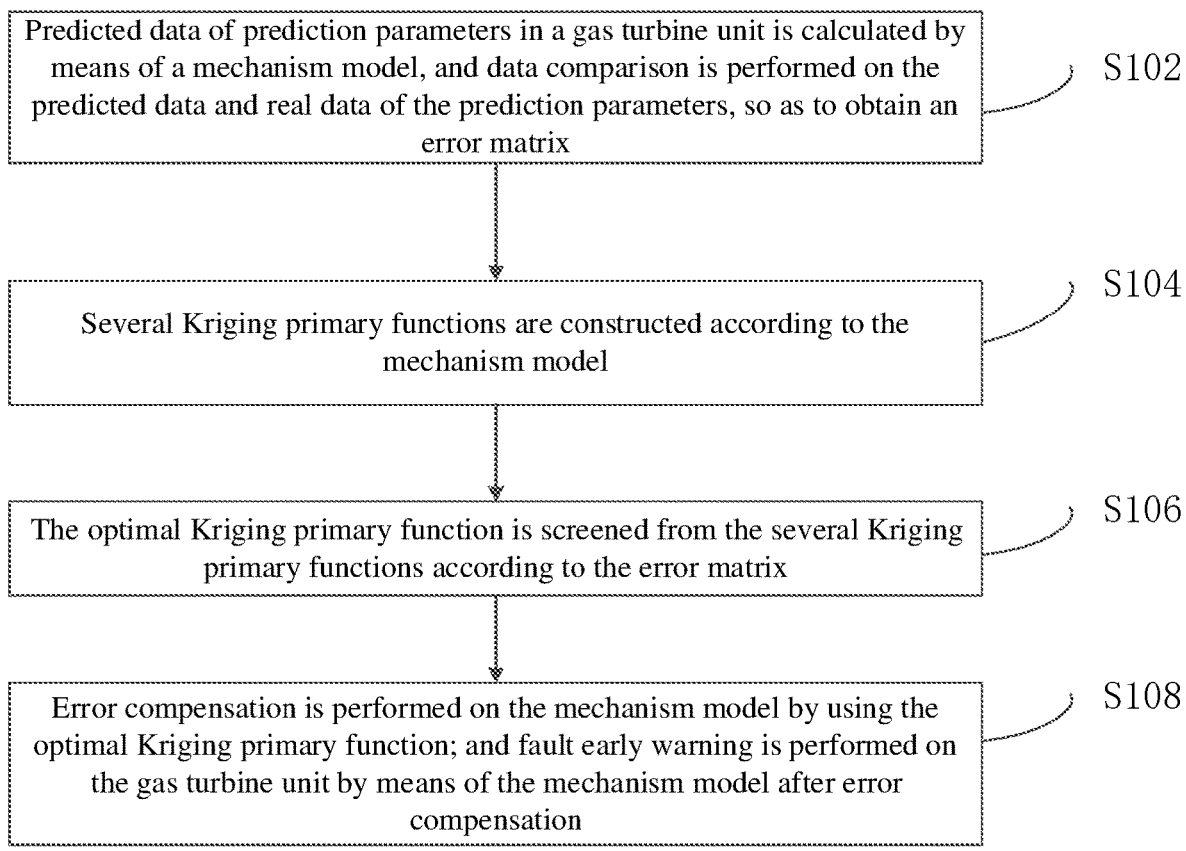
FIG. 1 is a flowchart of steps of a fault early-warning method applied to a gas turbine unit according to an embodiment of the present application.

To make the objectives, technical solutions and advantages of the present application clearer, the present application is described and illustrated below with reference to the drawings and embodiments. It should be understood that the specific embodiments described here are merely used to explain the present application, and are not used to limit the present application. All other embodiments obtained by those of ordinary skill in the art on the basis of the embodiments provided in the present application without creative work all fall within the scope of protection of the present application.

It is apparent that the drawings in the following descriptions are merely some examples or embodiments of the present application. For those of ordinary skill in the art, the present application may also be applied to other similar scenes according to these drawings without any creative work. In addition, it may also be understood that, although efforts made in such development process may be complex and lengthy, some changes in design, manufacturing or production changes on the basis of the technical content disclosed in the present application are only conventional technical means to a person of ordinary skill in the art related to the content disclosed in the present application, and should not be construed as inadequate for the content disclosed in the present application.

References to "embodiments" in the present application mean that particular features, structures or characteristics described in combination with the embodiments may be included in at least one embodiment of the present application. The presence of the phrase in various positions in the specification does not necessarily mean the same embodiment, nor is it a separate or alternative embodiment that is mutually exclusive with other embodiments. It is understood, both explicitly and implicitly, by one of ordinary skill in the art that the embodiments described in the present application may be combined with other embodiments without conflict.

Unless otherwise defined, technical terms or scientific terms involved in the present application shall have the ordinary meaning as understood by persons with ordinary skill in the technical field to which the present application belongs. The words "a", "an", "one of", "the"and similar words involved in the present application do not indicate a limit to the number of words, and may be expressed in the singular or plural. Terms "comprise", "include" and "have-"and any variations thereof involved in the present application are intended to cover non-exclusive inclusions. For example, it is not limited for processes, methods, systems, products or devices including a series of steps or modules (units) to listed steps or units, and other steps or units which are not listed or are inherent to these processes, methods, products or devices may be included instead. Similar words such as "connection", "connected" or "coupled" are not limited to physical or mechanical connection, but may include electrical connection, whether direct or indirect. "A plurality of" involved in the present application means two or more than two. The term "and/or" is an association relationship describing related objects, which means that there may be three relationships, for example, A and/or B may indicate three cases: A exists alone, A and B exist simultaneously, and B exists alone. The character "/" in this paper generally indicates that the related objects are in an "or" relationship. The terms "first", "second", "third", etc. in the present application are used merely to distinguish similar objects and do not represent a specific ranking of objects.

An embodiment of the present application provides a fault early-warning method applied to a gas turbine unit. FIG. 1 is a flowchart of steps of a fault early-warning method applied to a gas turbine unit according to an embodiment of the present application. As shown in FIG. 1, the method includes the following steps.

At S102, predicted data of prediction parameters in a gas turbine unit is calculated by means of a mechanism model, and data comparison is performed on the predicted data and real data of the prediction parameters, so as to obtain an error matrix.

Specifically, input data of the gas turbine unit is inputted into the mechanism model, and the predicted data of the prediction parameters in the gas turbine unit is calculated. Input parameters corresponding to the input data include a gas turbine rotary speed, generator power, an environment temperature, and environment humidity; and the prediction parameters include first axial displacement, second axial displacement, third axial displacement, high-pressure cylinder expansion, differential expansion of high and medium-pressure cylinders, low-pressure cylinder expansion, and high-pressure main steam pressure.

Preferably, by using a certain type of a heavy-duty combustion turbine unit as an example, using a gas turbine rotary speed, generator power, an atmospheric temperature, atmospheric humidity and the like as input parameters, and using axial displacement 1, axial displacement 2, axial displacement 3, high-pressure cylinder expansion, differential expansion of high and medium-pressure cylinders, low-pressure cylinder expansion, and high-pressure main steam pressure 1 (machine side) as output parameters (prediction parameters), the prediction parameters are successively set as G1, G2, G3, G4, G5, G6 and G7. The gas turbine rotary speed goes through 0 to 3000 rpm during a start-up process. Table 1 is a real data table of the prediction parameters in the certain heavy-duty combustion turbine unit. As shown in Table 1, by using the gas turbine rotary speed being 3000 rpm and 20 sampling points as an example, real data of the prediction parameters in the gas turbine unit is obtained; the real data is compared with the predicted data calculated by the mechanism model (that is, subtracting measured data from the predicted data); and obtained results are stored in the error matrix Er.

TABLE 1

| Sampling point | G1 | G2 | G3 | G4 | G5 | G6 | G7 | Gas turbine rotary speed |
|---|---|---|---|---|---|---|---|---|
| 1 | 0.191 | 0.273 | 0.198 | 16.702 | 7.203 | 32.247 | 9.134 | 2997.8 |
| 2 | 0.185 | 0.269 | 0.193 | 16.704 | 7.226 | 32.258 | 9.081 | 2997.8 |
| 3 | 0.183 | 0.269 | 0.193 | 16.704 | 7.234 | 32.26 | 9.047 | 2999.3 |
| 4 | 0.183 | 0.271 | 0.194 | 16.702 | 7.26 | 32.27 | 9.084 | 3001.9 |
| 5 | 0.209 | 0.297 | 0.221 | 16.704 | 7.263 | 32.268 | 9.202 | 3001.9 |
| 6 | 0.201 | 0.289 | 0.212 | 16.702 | 7.257 | 32.262 | 9.322 | 3000.7 |
| 7 | 0.207 | 0.296 | 0.219 | 16.702 | 7.251 | 32.248 | 9.284 | 3001.9 |
| 8 | 0.219 | 0.308 | 0.231 | 16.7 | 7.239 | 32.238 | 9.316 | 3001.9 |
| 9 | 0.229 | 0.319 | 0.241 | 16.704 | 7.234 | 32.232 | 9.516 | 3001.9 |
| 10 | 0.215 | 0.306 | 0.227 | 16.7 | 7.237 | 32.227 | 9.734 | 2998.9 |
| 11 | 0.226 | 0.317 | 0.239 | 16.7 | 7.206 | 32.187 | 9.503 | 2997.8 |
| 12 | 0.231 | 0.323 | 0.244 | 16.7 | 7.207 | 32.18 | 9.759 | 3000.4 |
| 13 | 0.187 | 0.279 | 0.2 | 16.703 | 7.217 | 32.186 | 9.458 | 2999.6 |
| 14 | 0.239 | 0.331 | 0.252 | 16.704 | 7.197 | 32.164 | 9.575 | 2999.3 |
| 15 | 0.205 | 0.297 | 0.218 | 16.702 | 7.202 | 32.165 | 9.64 | 2998.9 |
| 16 | 0.209 | 0.301 | 0.223 | 16.701 | 7.18 | 32.138 | 9.563 | 2998.9 |
| 17 | 0.234 | 0.326 | 0.247 | 16.7 | 7.148 | 32.095 | 9.525 | 3000.4 |
| 18 | 0.216 | 0.309 | 0.23 | 16.699 | 7.149 | 32.1 | 9.566 | 2997.8 |
| 19 | 0.225 | 0.318 | 0.238 | 16.703 | 7.144 | 32.089 | 9.727 | 2998.1 |
| 20 | 0.223 | 0.316 | 0.237 | 16.704 | 7.134 | 32.07 | 9.719 | 3000 |

It is to be noted that, the mechanism model is also called a white-box model, which is an accurate mathematical model established according to internal mechanisms of objects and production processes or transfer mechanisms of material flows. The model is a mathematical model of an object or a process obtained on the basis of a mass balance equation, an energy balance equation, a momentum balance equation, a phase balance equation, some physical property equations, chemical reaction laws, and basic laws of circuits. The advantage of the mechanism model is that the parameters have a very clear physical meaning. The parameters of the model are easy to adjust, such that the obtained model is highly adaptable.

At S104, several Kriging primary functions are constructed according to the mechanism model.

Specifically, input parameters of the mechanism model are used as input parameters of the Kriging primary functions, and prediction parameters of the mechanism model are used as output parameters of the Kriging primary functions, so as to construct the several preset Kriging primary functions.

Preferably, in order to improve the data following capability of the mechanism model, an appropriate primary function needs to be used to improve the calculation capability of a Kriging interpolation method. Some of the common Kriging custom functions are as follows:

Fourier:

$$f(x) = \sum_{i}^{n}[a_i\sin(d_iwi) + b_i\sin(d_iwi)] \qquad (1)$$

Polynomial:

$$f(x) = 1 + \sum_{i=1}^{n}d_i + \sum_{i=1}^{n}d_i^2 + \sum\sum_{i<j}d_id_j \qquad (2)$$

Index:

$$f(x) = e^{\sum_{i=1}^{n}(-\theta_i|d_i|)} \qquad (3)$$

Gauss:

$$f(x) = e^{\sum_{i=1}^{n}(-\theta_i|d_i|^2)} \qquad (4)$$

Trigonometric function:

$$f(x) = \sum_{i}^{n}[a_i\sin(b_id_i + c_i)] \qquad (5)$$

In order to construct a custom primary function, it is necessary to determine the output characteristics of the primary function by using key parameters of the gas turbine unit as input parameters and observed parameters as output values (that is, the input parameters and prediction parameters of the mechanism model). If functions are defined as $k(x_1, x_2 \ldots x_n)$, definition domains of the input parameters $x_1, x_2 \ldots x_n$ are as follows:

$$\begin{cases} X_1 \in [x_1^0 - \Delta x_1, x_1^0 + \Delta x_1] \\ X_2 \in [x_2^0 - \Delta x_2, x_2^0 + \Delta x_2] \\ \vdots \\ X_n \in [x_n^0 - \Delta x_n, x_n^0 + \Delta x_n] \end{cases} \qquad (6)$$

$X_1, X_2, \ldots, X_n$ are coordinate positions within input sample parameters; $x_1^0, x_2^0, \ldots, x_n^0$ are fluctuation center values; and $\Delta x_1, \Delta x_2, \ldots, \Delta x_n$ are fluctuation ranges. The amount of changes in the input parameters is simplified to a certain extent; and the primary function is simplified as follows:

$$\Delta F \approx \sum_{i=1}^{n}\Delta F_i + \Delta^2(\Delta x) \qquad (7)$$

$\Delta F$ is a function output value; and $\Delta^2(\Delta_x)$ is a higher order derivative of input parameter fluctuation.

If there is a certain function relationship between the functions $k(x_1, x_2 \ldots x_n)$ for $\Delta x_1, \Delta x_2, \ldots, \Delta x_n$, it exists as follows:

$$k(x_1^0, x_2^0 \ldots x_n^0) = \sum_{x_1^0 - \Delta x_1, x_2^0 + \Delta x_2 \ldots x_n^0 + \Delta x_n}^{x_1^0 + \Delta x_1, x_2^0 + \Delta x_2 \ldots x_n^0 + \Delta x_n} k(x_1, x_2 \ldots x_n)w \bigg|_{x_1, x_2 \ldots x_n} \qquad (8)$$

Where w is a weight coefficient, which displays the degree of importance that each point has in the total amount. When the taken point is a node, the weight coefficient w=1; and when the taken point is not a node, the weight coefficient 0<w<1. A boundary condition of the input parameters is set, and then it exists as follows:

$$\begin{cases} x_{1l} \le x_1 \le x_{1h} \\ x_{2l} \le x_2 \le x_{2h} \\ \vdots \\ x_{nl} \le x_n \le x_{nh} \end{cases} \qquad (9)$$

$x_{il}$ and $x_{ih}$ respectively represent upper and lower limits of an input quantity in the i-th component. Formulas (6), (7) and (8) are combined to obtain the following:

$$\Delta F_i = \sum_{(x_{1l}, x_{2l} \ldots x_{nl})}^{(x_{1h}, x_{2h} \ldots x_{nh})} w\Delta F(\Delta x_i)|_{x_1, x_2 \ldots x_n} G(x_1, x_2 \ldots x_n)|_{x_1^0, x_2^0 \ldots x_n^0} \qquad (10)$$

Where $G(x_1, x_2 \ldots x_n)$ is an interpolation function relative to $x_1, x_2 \ldots x_n$. The trend of the data of each component of the heavy-duty gas turbine unit studied in this method has a certain change relationship to the changes in power generation and gas turbine rotary speed, such that one interpolation function is required to meet a boundary constraint condition, and at the same time, a function relationship between input characteristics and output characteristics can be embodied. $G(x_1, x_2 \ldots x_n)$ is substituted into Formulas (3) and (4), so as to obtain the followings:

$$G(x_1, x_2 \ldots x_n)|_{(x_1^0, x_2^0 \ldots x_n^0)} = e^{\sum_{i=1}^{n}(-\theta_i|d_i|)} \qquad (11)$$

$$G(x_1, x_2 \ldots x_n)|_{(x_1^0, x_2^0 \ldots x_n^0)} = e^{\sum_{i=1}^{n}(-\theta_i|d_i|^2)} \qquad (12)$$

Where, $d_i=|x-x_i|$, x is an unknown value. $\theta_i$ is a parameter such as the output power and gas turbine rotary speed of the unit. The definition domain [0, 3000] of the gas turbine rotary speed is determined. By using $G_m$ as an example, 20 verification points are selected within a fluctuation range area of the gas turbine rotary speed. A weight coefficient model is obtained according to Formulas (7) and (8). $\theta_i$ may be obtained by means of calculation by using a hyperparametric optimization method of a particle swarm optimization algorithm.

At S106, the optimal Kriging primary function is screened from the several Kriging primary functions according to the error matrix.

Specifically, at step one, the error matrix is respectively fitted by means of the several Kriging primary functions, and the Kriging primary functions are screened according to several fitting results, so as to obtain a first primary function set.

Further, at step two, the reliability indexes of the Kriging primary functions in the first primary function set are respectively calculated by means of a Monte Carlo algorithm, a particle swarm optimization algorithm, a response surface algorithm and a unitary quadratic matrix algorithm; and a second primary function set with a convergence rate being higher than a preset threshold is screened according to the reliability indexes.

Further, at step three, derivatives of the Kriging primary functions in the second primary function set are calculated, and curve morphological characteristics of the Kriging primary functions are determined according to the derivatives. The curve morphological characteristics include a unimodal maximum characteristic, a unimodal minimum characteristic and a multimodal characteristic.

It is determined, according to the curve morphological characteristics, whether the corresponding Kriging primary function has a similar characteristic to a Schwefel function or a trigonometric function; if the Kriging primary function has a similar characteristic to the Schwefel function, a Tanimoto similarity between the Kriging primary function and the Schwefel function is calculated by means of a Tanimoto similarity function; if the Kriging primary function has a similar characteristic to the trigonometric function, a Tanimoto similarity between the Kriging primary function and the trigonometric function is calculated by means of the Tanimoto similarity function; and the optimal Kriging primary function is screened from the second primary function set according to the Tanimoto similarity.

Preferably, in step one, $\Delta G_m$ is used as an error term between the real data of the gas turbine unit and the predicted data calculated by the mechanism model. The parameters such as a gas turbine rotary speed variable x, axial displacement 1, axial displacement 2 and axial displacement 3 are used as dependent variables f(x).

Polynomial fitting is performed on $\Delta G_m$, and a fitting formula is as follows:

$$f(x)=p_1x^7+p_2x^6+p_3x^5+p_4x^4+p_5x^3+p_6x^2+p_7x+p_8 \quad (13)$$

Derivation is performed on the above formula; and there are $k_2$ solutions with df(x)/dx being equal to zero within the interval of the definition domain [0, 3000].

Gaussian fitting is performed on $\Delta G_m$, and a gaussian function obtained by means of fitting is as follows:

$$f(x) = a_1 e^{-\frac{(x-b_1)^2}{2c_1^2}} + a_2 e^{-\frac{(x-b_2)^2}{2c_2^2}} + a_3 e^{-\frac{(x-b_3)^2}{2c_3^2}} + a_4 e^{-\frac{(x-b_4)^2}{2c_4^2}} + a_5 e^{-\frac{(x-b_5)^2}{2c_5^2}} \quad (14)$$

Derivation may be performed on the above formula, so as to obtain $k_2$ solutions with df(x)/dx being equal to zero.

Fourier fitting is performed on $\Delta G_m$, and an obtained Fourier function is as follows:

$$f(x) = a_0 + \sum_{i=1}^{4}[a_i\cos(ixw) + b_i\sin(ixw)] \quad (15)$$

Derivation is performed on the above formula; and there are $k_3$ solutions with df(x)/dx being equal to zero within the interval of the definition domain [0, 3000].

Exponential fitting is performed on $\Delta G_m$, and the obtained function is as follows:

$$f(x)=ae^{bx}+ce^{dx} \quad (16)$$

Derivation is performed on the above formula; and there are $k_4$ solutions with df(x)/dx being equal to zero within the interval of the definition domain [0, 3000].

Trigonometric function fitting is performed on $\Delta G_m$, and the obtained function is as follows:

$$f(x) = \sum_{i=1}^{4}[a_i\sin(b_ix + c_i)] \quad (17)$$

Derivation is performed on the above formula; and there are $k_5$ solutions with df(x)/dx being equal to zero within the interval of the definition domain [0, 3000].

By means of comparing the number ki (i=1,2,3 . . . n) of zero solution with a $\Delta G_m$ curve, the primary functions are screened, such that it may be determined which form of the change curve corresponds to $\Delta G_m$. For example, the change curve in an exponential form does not correspond to $\Delta G_m$. Then other Kriging primary functions are further screened (to obtain the first primary function set).

Preferably, in step two, the optimal Kriging primary function cannot be usually screened for one time in step one. In order to further perform function selection, on the basis of a method of selecting samples for cumulation, reliability indexes of product functions are calculated by means of a Monte Carlo method, a particle swarm optimization method, a response surface method and a unitary quadratic matrix method. Failure probability is calculated by means of the monte carlo method, and the reliability indexes are obtained according to results; and by using the indexes as reference, comparison is performed on the reliability indexes of the primary functions calculated by other methods.

By using $\Delta G_i$ as an example, Table 2 is a calculation result table of the reliability indexes of a primary function model for $\Delta G_i$. By means of comparing a gaussian model, a Fourier model, and a polynomial model, it may be obtained, with the gaussian model as the primary function, that the reliability indexes can be achieved with the minimum number of function calculations by using the particle swarm optimization method.

TABLE 2

| Primary function | Method | Number of iterations | Number of function calculations | Calculation duration (s) |
| --- | --- | --- | --- | --- |
| Gaussian model | Particle swarm optimization | 131 | 659 | 986 |
| | Response surface | 188 | 944 | 1228 |
| | Unitary quadratic matrix | 146 | 587 | 1142 |
| | Monte Carlo | — | 105 | 2960 |
| Fourier model | Particle swarm optimization | 161 | 809 | 1327 |
| | Response surface | 197 | 989 | 1842 |
| | Unitary quadratic matrix | 203 | 815 | 1686 |
| | Monte Carlo | — | 105 | 3062 |
| Trigonometric function | Particle swarm optimization | 177 | 891 | 1477 |
| | Response surface | 206 | 1034 | 2064 |
| | Unitary quadratic matrix | 219 | 879 | 1878 |
| | Monte Carlo | — | 105 | 3013 |
| Polynomial model | Particle swarm optimization | 152 | 764 | 1124 |
| | Response surface | 206 | 1034 | 2062 |
| | Unitary quadratic matrix | 191 | 767 | 1762 |
| | Monte Carlo | — | 105 | 3011 |

When the primary functions are respectively the gaussian model, the Fourier model, the trigonometric function and the polynomial model, the Monte Carlo algorithm, the particle swarm optimization algorithm, the response surface algorithm and the unitary quadratic matrix algorithm are compared, so as to be concluded that the reliability indexes can be achieved with the minimum number of function calculations by using the particle swarm optimization method (that is, an optimal calculation algorithm). On the basis of the particle swarm optimization method, a second primary function set with a convergence rate being higher than a preset threshold is screened from each model.

Preferably, in step three, in order to further improve the fitness of a curve, determination needs to be performed on the curve before error correction, so as to select the appropriate Kriging primary function. The primary functions in the Kriging interpolation method have different curve characteristics, and the operation efficiency of the primary functions is not exactly the same, such that determination may be performed in advance according to function characteristics. The curve $\Delta G_m$ has a multimodal characteristic, a unimodal maximum characteristic, or a unimodal minimum characteristic. In order to further determine the form of the curve, first- and second-order derivations are performed on curve functions, and pre-determination is performed on data according to derivation results.

Pre-determination of error data

In order to identify an extreme value of the function, a Kriging interpolation primary function is set as f(x), wherein $a=(x_1, x_2, \ldots x_n) \in R^n$, and f(x) is continuously differentiable in the definition domain. Therefore, the following may be obtained:

$$\nabla f(x)(x-a) < 0 \tag{18}$$

It may be concluded that f(x) is a maximum value at a point a.

Likewise, if the following exists:

$$\nabla f(x)(x-a) > 0 \tag{19}$$

It may be concluded that f(x) is a minimum value at the point a.

According to f(x) being the gradient of the function at a position x, the following may be obtained:

$$\nabla f(x) = \left[\frac{\partial f(x)}{\partial x_1}, \frac{\partial f(x)}{\partial x_2}, \ldots, \frac{\partial f(x)}{\partial x_n}\right]^T \tag{20}$$

If adjacent extreme points $x_1, x_2, \ldots x_n$ enable a first-order derivative of f(x) to be zero, because the characteristics of the first-order derivative cause the two adjacent points $x_i$ and $x_{i+1}$ to be a local maximum or minimum value, the two points that are apart from each other are used as a standard for determining the function curve. If function values of the two points that are apart from each other monotonically increase, and second-order derivatives multiplied to be a positive number, it may be determined that the function graph of the section has the unimodal maximum characteristic. That is:

$$\begin{cases} \frac{\partial f(x)}{\partial x_1} = 0, \frac{\partial f(x)}{\partial x_2} = 0, \ldots, \frac{\partial f(x)}{\partial x_n} = 0 \\ f(x_i) < f(x_{i+2}) \\ f(x_{i+1}) < f(x_{i+3}) \\ \frac{\partial^2 (x) \partial^2 f(x)}{\partial^2 x_i \partial^2 x_{i+2}} > 0 \end{cases} \tag{21}$$

If the function values of the two adjacent points monotonically decrease, and the second-order derivatives multiplied to be the positive number, it may be considered that the function graph of the section has the unimodal minimum characteristic. That is:

$$\begin{cases} \frac{\partial f(x)}{\partial x_1} = 0, \frac{\partial f(x)}{\partial x_2} = 0, \ldots, \frac{\partial f(x)}{\partial x_n} = 0 \\ f(x_i) > f(x_{i+2}) \\ f(x_{i+1}) > f(x_{i+3}) \\ \frac{\partial^2 (x) \partial^2 f(x)}{\partial^2 x_i \partial^2 x_{i+2}} > 0 \end{cases} \tag{22}$$

If the function values of the two adjacent points monotonically increase or decrease, it may be determined that the function graph of the section is in a multi-wave crest shape. The extreme values of scattered data may be determined by performing derivation on the function, but the specific form of the scattered data cannot be specifically identified. That is:

$$\begin{cases} f(x_i) < f(x_{i+2}), f(x_i) > f(x_{i+2}) \\ \frac{\partial f(x)}{\partial x_1} = 0, \frac{\partial f(x)}{\partial x_2} = 0, \ldots, \frac{\partial f(x)}{\partial x_n} = 0 \\ f(x_{i+1}) > f(x_{i+3}), f(x_{i+1}) < f(x_{i+3}) \end{cases} \tag{23}$$

Since a function derivation and determination method cannot process the situation of complex distribution of the scattered data, correlation analysis is performed on the scattered data by introducing a benchmark function. If the benchmark function is highly correlated with the distribution of the scattered data, the scattered data may use the Kriging primary function corresponding to the benchmark function.

A method curve is determined by introducing a Schwefel function graph and a trigonometric function graph as a curve trend of the scattered data. The Schwefel graph is characterized by a trend of nonlinear multi-wave crests amplified step by step. The basic type of the Schwefel function is as follows:

$$f(x) = x \sin(\sqrt{|x|}) \tag{24}$$

If a $\Delta G_3$ function curve has a similar characteristic with a Schwefel function curve, Formula (24) may be modified:

$$f(x) = -1 - 2.6x \sin(-3.8 + 15\sqrt{|x - 0.02|}) \tag{25}$$

The similarity of two groups of curves is verified by using a Tanimoto coefficient, and a Tanimoto similarity function is as follows:

$$T(x_1, x_2) = \frac{\sum x_{1i} x_{2i}}{\sum x_{1i}^2 + \sum x_{2i}^2 - \sum x_{1i} x_{2i}} \tag{26}$$

According to Formulas (25) and (26), the similarity of Schwefel and $\Delta G_3$ may be obtained to be 0.77. Likewise, by means of using the improved Schwefel function to compare with $\Delta G_4$, the Tanimoto similarity is 0.8. The formula of the Schwefel function improved for $\Delta G_4$ is as follows:

$$f(x) = -0.5 - 2x \sin(-4 + 9.75\sqrt{|x - 0.005|}) \tag{27}$$

If the $\Delta G_1$ function curve has a similar characteristic with a trigonometric function curve, the formula of a trigonometric function f(x) improved for $\Delta G_1$ is as follows:

$$f(x) = -0.25 \cos(3.5x - 0.5) + 0.05 \tag{28}$$

The similarity of the trigonometric function and $\Delta G_1$ may be obtained to be 0.86. Likewise, by means of using the improved trigonometric function to compare with $\Delta G_2$, the Tanimoto similarity is 0.92. The formula of the trigonometric function improved for $\Delta G_2$ is as follows:

$$f(x)=1.5\cos(5x-12)-1.2 \qquad (29)$$

After all $\Delta G_k$ curves are determined and compared, the Tanimoto similarity of $\Delta G_1$, $\Delta G_2$, $\Delta G_5$, $\Delta G_6$ and $\Delta G_7$ with the trigonometric function exceeds 0.7, and the Tanimoto similarity of $\Delta G_3$ and $\Delta G_4$ with the Schwefel function exceeds 0.7. According to the Tanimoto similarity of the $\Delta G$ curve with the trigonometric function and the Schwefel function, the optimal Kriging primary function is screened for the AG curve from the second primary function set. For example, for the curve of which Tanimoto similarity with the Schwefel function exceeds 0.7, the Kriging interpolation primary function uses the gaussian model; and for the curve of which Tanimoto similarity with the trigonometric function exceeds 0.7, the Kriging interpolation primary function uses the Fourier model.

It is to be noted that, the distribution of the scattered data of the error matrix basically conforms to the characteristics of two standard function graphs 1. unimodal function; 2. multimodal function. Therefore, the leakage permeance data of each section uses the Schwefel function and the trigonometric function as determination criteria. The Tanimoto similarity is suitable for processing preference data without scoring The Tanimoto similarity measures the consistency of the direction of the values between dimensions, focuses on the differences between the dimensions, and does not focus on the differences in numerical values, such that the Tanimoto similarity is more suitable for calculating curve similarity. The results of the Tanimoto similarity range from 0 to 1; $T(x_1, x_2)=1$ means complete overlapping; and $T(x_1,x_2)=0$ means no overlapping terms.

At S108, error compensation is performed on the mechanism model by using the optimal Kriging primary function; and fault early warning is performed on the gas turbine unit by means of the mechanism model after error compensation.

Preferably, P is set as the real data, Q is the predicted data calculated by the mechanism model, and then the following exists:

$$Er=P-Q \qquad (30)$$

The error of each sampling point is set as $\Delta G$, the following exists:

$$Er = \begin{bmatrix} \Delta G_{11} & \Delta G_{12} & \dots & \Delta G_{1m} \\ \Delta G_{21} & \ddots & & \Delta G_{2m} \\ \vdots & & \ddots & \vdots \\ \Delta G_{n1} & \Delta G_{n2} & \dots & \Delta G_{nm} \end{bmatrix} \qquad (31)$$

Where, $\Delta G_{ij}$ represents error data of each sampling point; n represents atmospheric pressure or another input parameter; and m represents gas turbine rotary speed.

The data obtained by means of calculation of the primary functions is compared with error terms, so as to determine the primary function of the optimal Kriging primary function. An expression is shown as follows:

$$f(x_1, x_2, \dots, x_q)=\min\{f_k(x_1, x_2, \dots, x_q)-Er\ [k;]\} \qquad (32)$$

Where, k=1, 2, 3, ... n; and q represents the dimension of an input sample.

After $f(x_1, x_2, \dots x_q)$ is determined, the rotary speed and the error $\Delta G$ of the sampling point are fitted with the optimal Kriging primary function, so as to obtain a function relationship:

$$\Delta G=p_{00}+p_{10}r+p_{01}f^2(x_1, x_2 \dots x_q)+p_{20}r^2+ p_{11}rf(x_1,x_2 \dots x_q) \qquad (33)$$

Where, r is gas turbine rotary speed.
The above formula is converted to obtain the following:

$$f_{Er}(r, x_1, x_2, \dots, x_q)=X[\Delta G,r,f(x_1, x_2, \dots, x_q)] \qquad (34)$$

Where, $f_{Er}(r, x_1, x_2 \dots x_q)$ is an error compensation function for the changes in the sampling points of the gas turbine rotary speed.

An output function of the ith section is set as $q_i(x)$, and may be calculated by substituting a sample $[x_1, x_2, \dots X_q]$ into the mechanism model; and x is a point to be measured outside a sample size. The following may be obtained:

$$w_i(x)=f_{eri}(x)+q_i(x) \qquad (35)$$

Where, $w_i(x)$ is calculation data of the mechanism model that is subjected to error correction; and compared with $q_i(x)$, $w_i(x)$ is closer to the measured data. When there is data exception in the gas turbine unit, there is a difference between $w_i(x)$ and the measured data, such that fault early warning is realized. In addition, when there is no data exception in the gas turbine unit, by means of the method, error compensation can be performed on the mechanism model, so as to reduce fault false alarms.

By means of S102 to S108 in the embodiments of the present application, the problem of a large number of fault false alarms in fault early warning of an existing gas turbine is solved, the fault early warning of the gas turbine unit after error compensation is performed on the mechanism model on the basis of the improved Kriging primary functions is realized, and a false alarm rate of the mechanism model for fault early warning is reduced.

It is to be noted that, the steps shown in the above processes or the flowchart of the drawings may be executed in a computer system, such as a set of computer-executable instructions, and although a logical sequence is shown in the flow diagram, in some cases, the steps shown or described may be executed in a different order than here.

Figure 2:
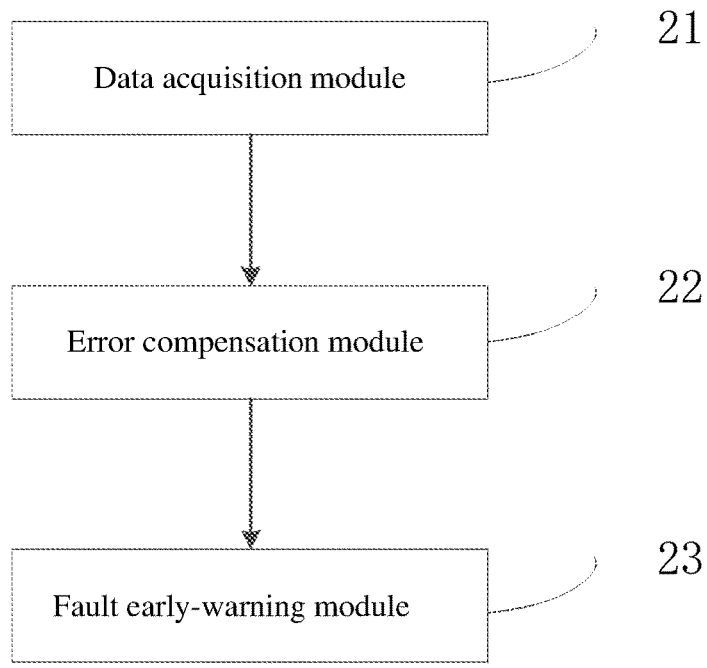
FIG. 2 is a structural block diagram of a fault early-warning system applied to a gas turbine unit according to an embodiment of the present application.

An embodiment of the present application provides a fault early-warning system applied to a gas turbine unit. FIG. 2 is a structural block diagram of a fault early-warning system applied to a gas turbine unit according to an embodiment of the present application. As shown in FIG. 2, the system includes a data acquisition module 21, an error compensation module 22, and a fault early-warning module 23.

The data acquisition module 21 is configured to calculate, by means of a mechanism model, predicted data of prediction parameters in a gas turbine unit, and perform data comparison on the predicted data and real data of the prediction parameters, so as to obtain an error matrix.

The error compensation module 22 is configured to construct several Kriging primary functions according to the mechanism model; and screen an optimal Kriging primary function from the several Kriging primary functions according to the error matrix, and perform error compensation on the mechanism model by using the optimal Kriging primary function.

The fault early-warning module 23 is configured to perform fault early warning on the gas turbine unit by means of the mechanism model after error compensation.

By means of the data acquisition module 21, the error compensation module 22, and the fault early-warning module 23 in the embodiments of the present application, the problem of a large number of fault false alarms in fault early warning of an existing gas turbine is solved, the fault early warning of the gas turbine unit after error compensation is performed on the mechanism model on the basis of the improved Kriging primary functions is realized, and a false alarm rate of the mechanism model for fault early warning is reduced.

It is to be noted that, each of the above modules may be either functional modules or program modules, and may be implemented either by means of software or hardware. For the modules implemented by means of the hardware, the modules may be located in the same processor; or the modules may also be located in different processors in any combination.

This embodiment further provides an electronic apparatus. The electronic apparatus includes a memory and a processor. The memory is configured to store a computer program. The processor is configured to run the computer program to execute steps in any one of method embodiments described above.

Optionally, the electronic apparatus may further include a transmission device and an input/output device. The transmission device is connected to the processor. The input/output device is connected to the processor.

It is to be noted that, for specific examples in this embodiment, refer to the examples described in the foregoing embodiments and the optional implementations, and this embodiment will not be repeated thereto.

In addition, in combination with the fault early-warning method applied to a gas turbine unit in the above embodiments, an embodiment of the present application may provide a storage medium for implementation. The storage medium stores a computer program. Any one of the fault early-warning methods applied to a gas turbine unit described in the above embodiments is implemented when the computer program is executed by a processor.

An embodiment provides a computer device. The computer device may be a terminal. The computer device includes a processor, a memory, a network interface, a display screen, and an input apparatus that are connected by using a system bus. The processor of the computer device is configured to provide calculation and control capabilities. The memory of the computer device includes a non-volatile storage medium or an internal memory. The non-volatile storage medium stores an operating system and a computer program. The internal memory provides an environment for the running of the operating system and the computer program in the non-volatile storage medium. The network interface of the computer device is configured to be communicatively connected to an external terminal by means of a network. When being executed by the processor, the computer program implements the fault early-warning method applied to a gas turbine unit. The display screen of the computer device may be a liquid crystal display screen or an electronic ink display screen. The input apparatus of the computer device may be a touch layer covered on the display screen, may be a button, a trackball or a touch-control panel which are provided on a housing of the computer device, or may be an external keyboard, touch-control panel or mouse.

Figure 3:
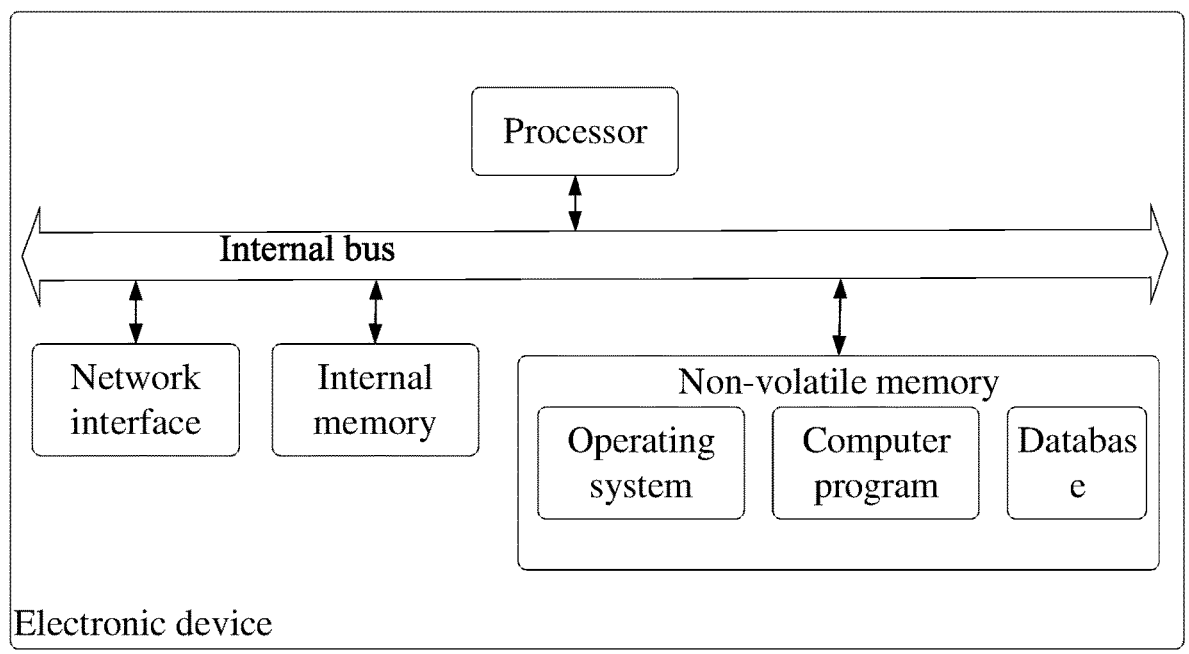
FIG. 3 is a schematic diagram of an internal structure of an electronic device according to an embodiment of the present application.

In an embodiment, FIG. 3 is a schematic diagram of an internal structure of an electronic device according to an embodiment of the present application. As shown in FIG. 3, this embodiment provides an electronic device. The electronic device may be a server, and an internal structure diagram of the electronic device may be shown in FIG. 3.

The electronic device includes a processor, a network interface, an internal memory and a non-volatile memory that are connected by means of an internal bus. The non-volatile memory stores an operating system, a computer program and a database. The processor is configured to provide calculation and control capabilities. The network interface is configured to be communicatively connected to an external terminal by means of a network. The internal memory is configured to provide an environment for the running of the operating system and the computer program. When being executed by the processor, the computer program implements the fault early-warning method applied to a gas turbine unit. The database is configured to store data.

It may be understood by those skilled in the art that the structure shown in FIG. 3, which is only a block diagram of a portion of the structure associated with the solutions of the present application, does not constitute a limitation of the electronic device to which the solutions of the present application are applied. The specific electronic device may include more or fewer components than shown in the figures, or be combined with certain components, or have a different arrangement of components.

Those of ordinary skill in the art will appreciate that implementing all or part of the processes in the methods described above may be accomplished by instructing associated hardware by a computer program, which may be stored in a non-volatile computer-readable storage medium, which, when executed, may include processes as embodiments of the methods described above. Any reference to a memory, storage, a database, or other media used in the embodiments provided in the present application may include nonvolatile and/or volatile memories. The non-volatile memories may include a Read-Only Memory (ROM), a Programmable ROM (PROM), an Electrically Programmable ROM (EPROM), an Electrically Erasable and Programmable ROM (EEPROM), or a flash memory. The volatile memories may include a Random Access Memory (RAM), or an external cache memory. As not a limitation but an illustration, the RAM is available in many forms, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchronous Chain Channel (Synchlink) DRAM (SLDRAM), a Direct Memory Bus Dynamic RAM (DRDRAM), and a Memory Bus Dynamic RAM (RDRAM), among others.

Those skilled in the art should understand that, various technical features of the above embodiments may be combined arbitrarily. For brevity of description, description is not made to all possible combinations of the various technical features of the above embodiments are described. However, all the combinations of these technical features should be considered to fall within the scope of disclosure contained in the specification as long as there is no contradiction between the combinations of those technical features.

The above embodiments merely illustrate several implementations of the present application, which are specifically described in detail, but are not to be construed as limiting the scope of the present patent for the present invention. It should be pointed out that those of ordinary skill in the art can also make some modifications and improvements without departing from the concept of the present application, and these modifications and improvements all fall within the scope of protection of the present application. Accordingly, the scope of the patent of the present application should be subject to the appended claims.

What is claimed is:

1. An effective fault early-warning method applied to a gas turbine unit on a basis of Kriging primary functions, comprising:
   calculating, by means of a mechanism model, predicted data of prediction parameters in a gas turbine unit, and performing data comparison on the predicted data and real measurement data of the prediction parameters, so as to obtain an error matrix;
   constructing several Kriging primary functions according to the mechanism model;
   screening an optimal Kriging primary function from the several Kriging primary functions according to the error matrix, wherein screening the optimal Kriging primary function further include
      respectively fitting the error matrix by means of the several Kriging primary functions, and screening the Kriging primary functions according to several fitting results, so as to obtain a first primary function set;
      respectively calculating the reliability indexes of the Kriging primary functions in the first primary function set by means of a monte carlo algorithm, a particle swarm optimization algorithm, a response surface algorithm and a unitary quadratic matrix algorithm; and screening, according to the reliability indexes, a second primary function set with a convergence rate being higher than a preset threshold, and then screening the optimal Kriging primary function from the second primary function set;
   performing error compensation on the mechanism model by using the optimal Kriging primary function to reduce false alarm rate of the mechanism model for fault early warning; and
   performing fault early warning on the gas turbine unit by means of the mechanism model after error compensation.

2. The method according to claim 1, wherein the screening the optimal Kriging primary function from the second primary function set comprises:
   calculating derivatives of the Kriging primary functions in the second primary function set, and determining curve morphological characteristics of the Kriging primary functions according to the derivatives, wherein the curve morphological characteristics comprise a unimodal maximum characteristic, a unimodal minimum characteristic and a multimodal characteristic; and
   screening the optimal Kriging primary function from the second primary function set according to the curve morphological characteristics.

3. The method according to claim 2, wherein the screening the optimal Kriging primary function from the second primary function set according to the curve morphological characteristics comprises:
   determining, according to the curve morphological characteristics, whether the corresponding Kriging primary function has a similar characteristic to a Schwefel function or a trigonometric function;
   if the Kriging primary function has a similar characteristic to the Schwefel function, calculating a Tanimoto similarity between the Kriging primary function and the Schwefel function by means of a Tanimoto similarity function;
   if the Kriging primary function has a similar characteristic to the trigonometric function, calculating a Tanimoto similarity between the Kriging primary function and the trigonometric function by means of the Tanimoto similarity function; and
   screening the optimal Kriging primary function from the second primary function set according to the Tanimoto similarity.

4. The method according to claim 2, wherein the screening, according to the reliability indexes, a second primary function set with a convergence rate being higher than a preset threshold comprises:
   selecting an optimal calculation algorithm from the monte carlo algorithm, the particle swarm optimization algorithm, the response surface algorithm and the unitary quadratic matrix algorithm according to the number of function calculations of the reliability indexes of the Kriging primary functions; and
   screening, according to the reliability indexes calculated by the optimal calculation algorithm, the second primary function set with the convergence rate being higher than the preset threshold.

5. The method according to claim 1, wherein the constructing several preset Kriging primary functions according to the mechanism model comprises:
   using input parameters of the mechanism model as input parameters of the Kriging primary functions, and using prediction parameters of the mechanism model as output parameters of the Kriging primary functions, so as to construct the several preset Kriging primary functions.

6. The method according to claim 1, wherein the calculating, by means of a mechanism model, predicted data of prediction parameters in a gas turbine unit comprises:
   inputting input data of the gas turbine unit into the mechanism model, and calculating the predicted data of the prediction parameters in the gas turbine unit, wherein input parameters corresponding to the input data comprise a gas turbine rotary speed, generator power, an environment temperature, and environment humidity; and the prediction parameters comprise first axial displacement, second axial displacement, third axial displacement, high-pressure cylinder expansion, differential expansion of high and medium-pressure cylinders, low-pressure cylinder expansion, and high-pressure main steam pressure.

* * * * *